Dec. 11, 1945.  W. W. PABST  2,390,895
CONVEYER MECHANISM
Filed May 30, 1945   3 Sheets-Sheet 2
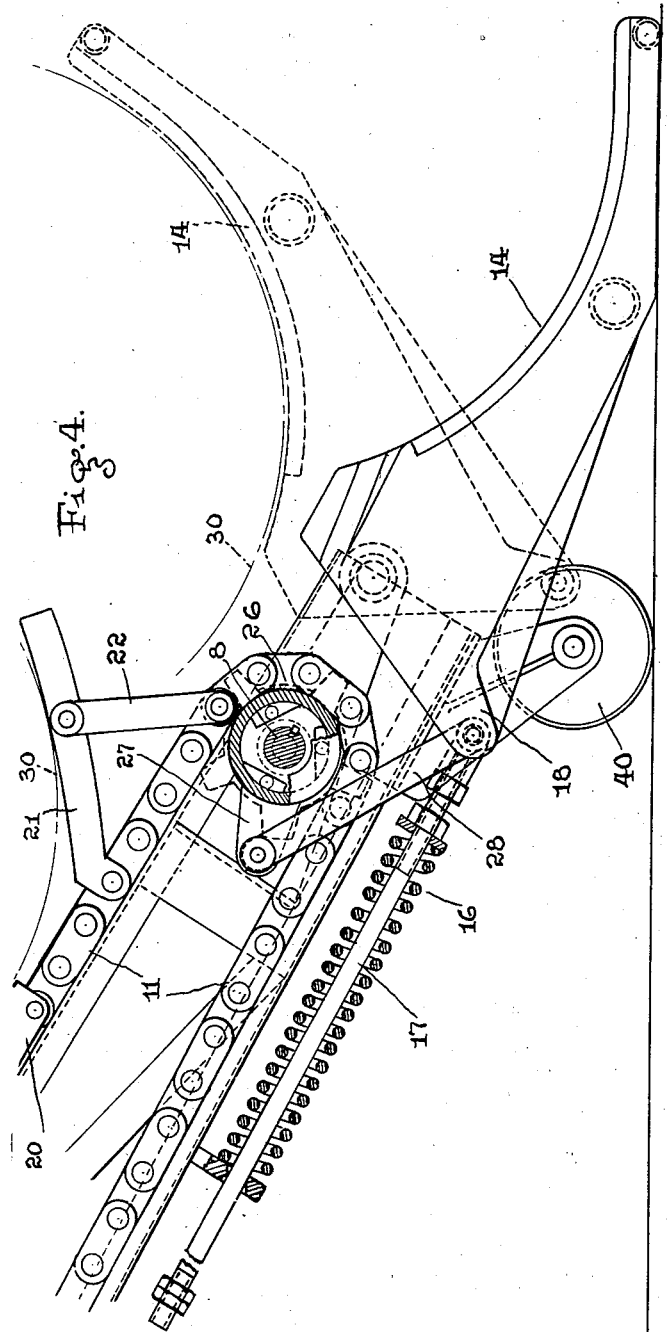
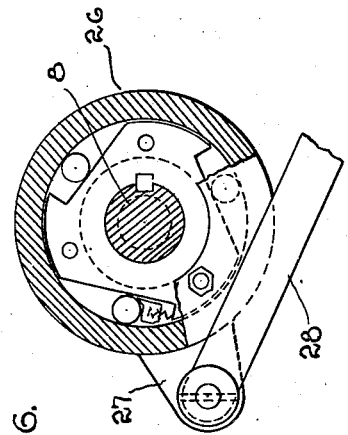
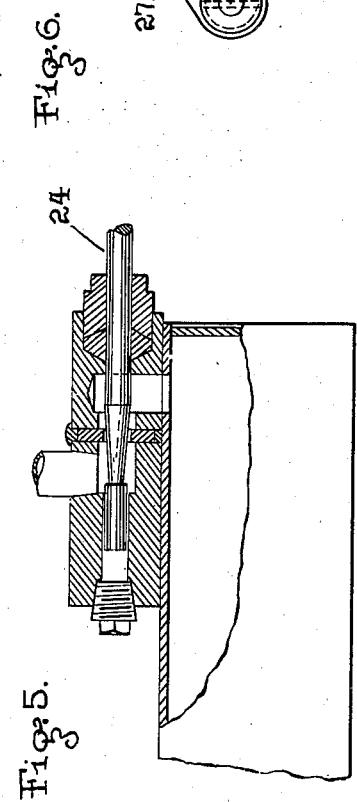

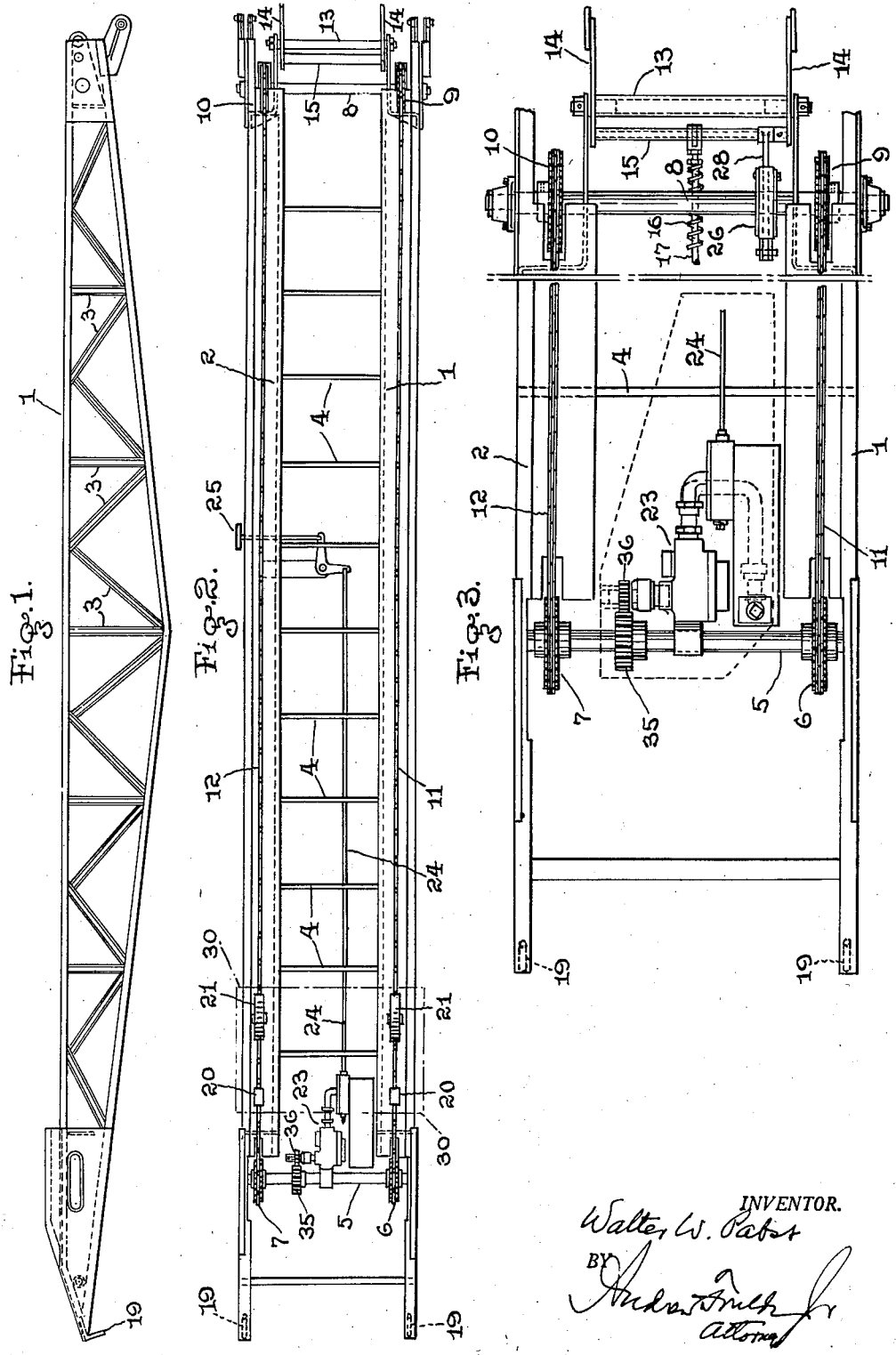

Dec. 11, 1945.    W. W. PABST    2,390,895
CONVEYER MECHANISM
Filed May 30, 1945    3 Sheets-Sheet 3
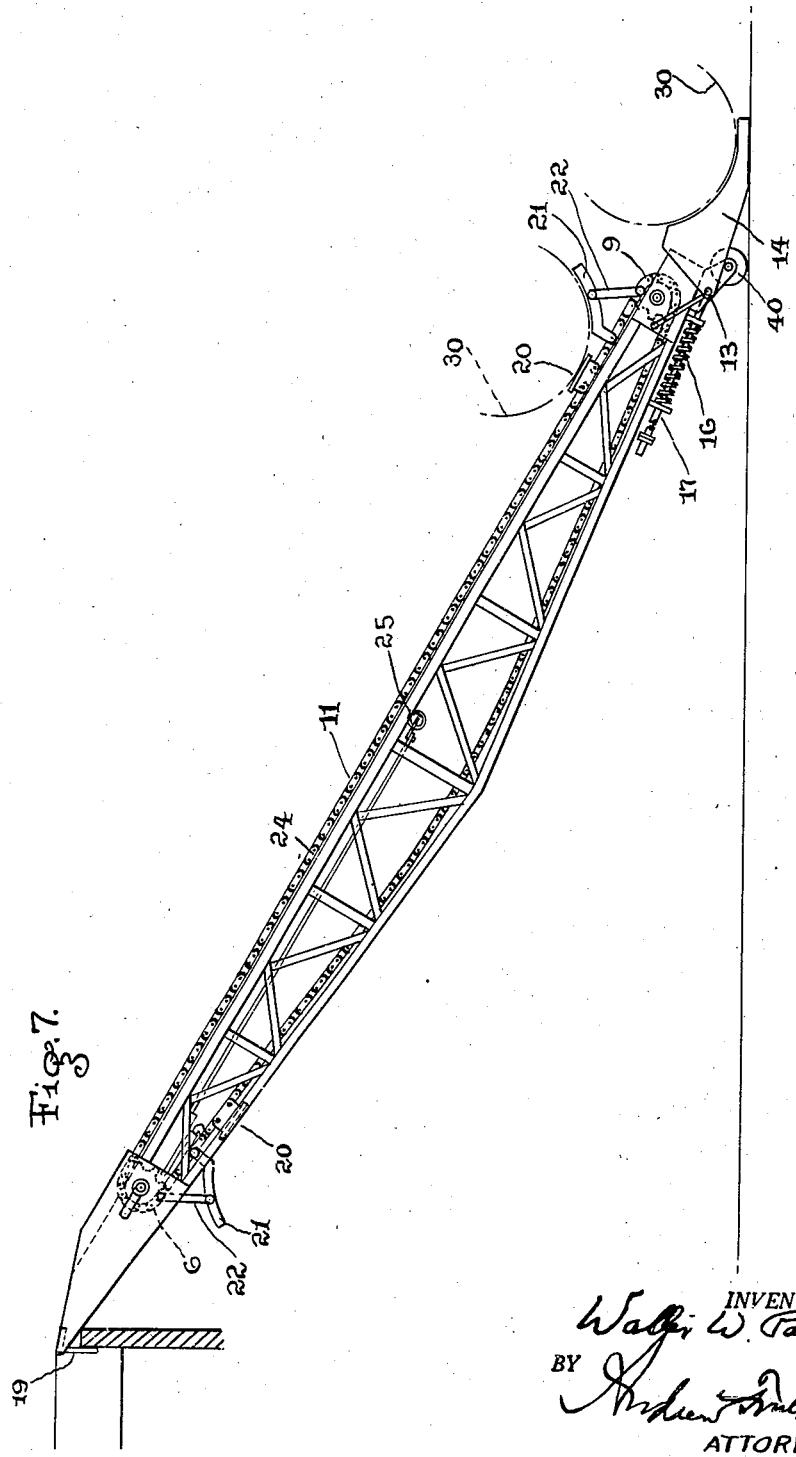
INVENTOR.
Walter W. Pabst
BY
ATTORNEY Patented Dec. 11, 1945

2,390,895

UNITED STATES PATENT OFFICE 2,390,895

CONVEYER MECHANISM

Walter W. Pabst, Elizabeth, N. J.

Application May 30, 1945, Serial No. 596,673

4 Claims. (Cl. 198—27)

The invention relates to improvements in portable gravity conveyers and is particularly adapted for use in unloading and transferring to a lower elevation packages such as barrels, drums, rolls and the like.

An object of the invention is to provide means for unloading and lowering merchandise.

A further object of the invention is to provide means for regulating and controlling the speed and operation of a gravity conveyer.

A further object of the invention is to provide means for controlling the discharge of merchandise from a gravity conveyer.

A further object of the invention is to provide means for carrying merchandise on a gravity conveyer.

A further object of the invention is to provide drive means in a gravity conveyer adapted to drive the device when the load is discharged.

Other objects and advantages of the invention will be apparent from the following description:

A preferred embodiment of the invention is illustrated in the accompanying drawings, in which Fig. 1 is a side view of the frame, Fig. 2 is a plan view of the same, Fig. 3 is an enlarged plan view of the receiving and discharge ends of the device separated by broken lines, Fig. 4 is a detail of the discharge end of the device, Fig. 5 is a detail of the hydraulic regulating valve for regulating and controlling the speed of the conveyer, Fig. 6 is a detail of the friction clutch, and Fig. 7 is a side view of the complete machine.

Similar characters of reference refer to like parts throughout the several views.

In the embodiment of the invention illustrated in the accompanying drawings, there is shown a frame comprising a pair of parallel side members 1 and 2, which may each be formed of marginal angle irons suitably held and braced together by transverse and diagonal members 3, which may be spot welded or otherwise secured to form a rigid structure. At suitable intervals there are provided spacing cross bars 4 extending between the said members 1 and 2.

The frame is of a length sufficient to extend in an inclined position from the deck, floor or loading platform to the ground or lower level to which the load is to be conveyed.

As viewed in Figs. 1 and 2, the end of the frame to the left is the receiving end and the end to the right is the discharge end.

At the receiving end of the frame there is journalled a rotatable cross shaft 5 which carries sprocket wheels 6 and 7.

At the discharge end of the frame there is journalled a rotatable cross shaft 8 which carries sprocket wheels 9 and 10.

Endless conveyer chains 11 and 12 pass around and are carried by the said sprocket wheels, one chain 11 being carried by the sprockets 6 and 9 and the other chain 12 being carried by the sprockets 7 and 10.

At the discharge end of the frame there is journalled a cross shaft 13 which carries swinging cradle arms 14, 14 carried by a cross bar 15 normally spring supported in raised position by means of a tension spring 16 coiled upon a rod 17, one end of which is connected with a lever projection 18 on the swinging cradle arm 14, whereby the free ends of the said cradle are normally held in an upright or elevated position as shown by dotted lines in Fig. 4 and may be swung downwardly by pressure acting against the said spring tension.

At the receiving end of the frame there is provided a hook element 19 whereby the floor of the loading platform, not shown, may be detachably engaged.

On each of the conveyer chains 11 and 12 there are provided a plurality, preferably two, pairs of load engaging elements, the counterpart members of each pair being arranged in parallel horizontal alignment to hold the ends of the load in horizontal position transversely of the frame. Each of the said load engaging elements comprises a bed 20 secured to the chain element with a stop also connected to the chain in advance of the said bed 20. The said stop element may comprise an arcuate arm 21 secured to the chain and shaped to be engaged by the cylindrical wall of a roll, drum or barrel load and a supporting brace 22 mounted on the chain and secured to the said arm 21, whereby the arm is held in raised position as shown in Fig. 4.

I prefer to employ the pairs of said load engaging elements on the chains at equally spaced points thereon so that when a load is released from the lower of the said load engaging elements, another of the said load engaging elements will be at the receiving end of the frame positioned to receive another load.

The operative portion of the said conveyer chains is the portion thereof which travels on the upper surface of the frame, and is driven by gravity by the weight of the load from the upper or receiving end of the frame to the lower or discharge end thereof.

There is provided on the rotatable cross shaft 5 which carries the upper sprockets 6 and 7 a speed retarding device 23 which may comprise a hydraulic brake element which may include a cog wheel 35 on the shaft 5 in mesh with a pinion 36, the construction and operation of which is well understood and need not be more particularly explained, and which serves to retard or brake the rotation of the cross shaft 5 by hydraulic means whereby the speed of travel of the conveyer chains may be regulated.

A rod 24 may be provided extending along the frame from the hydraulic brake element 23 to a position within convenient reach of the operator and having a crank-handle or wheel 25, adapted to be used by the operator for regulating the hydraulic pressure on the rotatable shaft 5.

On the rotatable cross shaft 8 journalled at the discharge end of the frame and which carries the sprockets 9, 10, there is provided a friction clutch 26 which permits the said shaft to be freely rotated by the sprockets thereon when the cradle arms 14, 15, are in normal raised position and is brought into operation to clutch the shaft 8 when the cradle arm 14, 14 are swung downward. A lever 27 on the friction clutch 26 is secured to and is actuated by a link or rod 28 on the cradle bar 15, whereby the clutch operates to engage the rotatable shaft when the cradle arms 14, 14 are swung downward.

As above explained, the conveyer chains 11, 12 are driven by the weight or gravity of a load thereon indicated at 30. As the load 30 reaches the discharge end of the frame, the load engaging elements 21 pass over the sprockets 9 and 10, and the load 30 carried thereby rolls off against and is received by the cradle arms 14, 14 which are thereby swung downward and the load is discharged.

The conveyer chains 11 and 12 continue in operation when the driving load 30 is discharged and the then upper load engaging element 21 is brought into position to receive a second load 30, by means of the clutch 26 operated by the rod 28, which connects the swinging cradle arms 14, 14 with the clutch 26 whereby the rotatable shaft 8 is engaged and caused to rotate as the cradle arms 14, 14 swing on their pivot shaft 13 and the sprockets 9 and 10 on the shaft 8 rotate with the shaft 8 and drive the chains 11 and 12 a distance sufficient to bring the upper or second load engaging elements into position to receive a second load and the device continues to operate as above explained.

Rollers 40 may be provided at the discharge end of the device for more conveniently moving the structure.

Having thus described the invention, what is claimed is:

1. A gravity conveyer comprising, in combination, a frame having a receiving end and a discharge end and adapted to operate in a position inclined from the horizontal, a rotatable cross shaft journalled at the receiving end and a second rotatable shaft journalled at the discharge end of the frame, sprocket wheels on said shafts at their respective ends, endless conveyer chains on said sprocket wheels extending from end to end of said frame in parallel relation and adapted to be driven by the weight of a load removably carried thereon, a load supporting element on the said chains upon which the said load is adapted to rest, a spring held swinging cradle pivotally mounted at the discharge end of the said frame and adapted to receive the load from said conveyer and to be swung thereby and clutch means connected with said cradle and conveyer whereby the conveyer chain is advanced by the swinging of the cradle when the load is discharged from the conveyer.

2. A gravity conveyer comprising, in combination, a frame having a receiving end and a discharge end and adapted to operate in a position inclined from the horizontal, a rotatable cross shaft journalled at the receiving end and a second rotatable shaft journalled at the discharge end of the frame, sprocket wheels on said shafts at their respective ends, endless conveyer chains on said sprocket wheels extending from end to end of said frame in parallel relation and adapted to be driven by the weight of a load removably carried thereon, a load supporting element on the said conveyer upon which said load is adapted to rest, a spring held swinging cradle pivotally mounted at the discharge end of the said frame and adapted to receive the load from said conveyer and to be swung thereby and clutch means connected with said cradle and conveyer whereby the conveyer is advanced by the swinging of the cradle when the load is discharged from the conveyer, and brake means on the first named shaft adapted to retard the speed of travel of the said conveyer.

3. A frame having a receiving end and a discharge end and adapted to operate in a position inclined from the horizontal plane, a gravity driven endless conveyer element on said frame adapted to be driven by the weight of a load removably carried thereby, a spring held pivotally mounted swinging load receiving element at the discharge end of the said frame and positioned to receive the load from the said conveyer element and to be thereby moved against the tension of its spring support means, a spring support for said load receiving element.

4. A frame having a receiving end and a discharge end and adapted to operate in a position inclined from the horizontal plane, a gravity driven endless conveyer element on said frame adapted to be driven by the weight of a load removably carried thereby, a spring held pivotally mounted swinging load receiving element at the discharge end of the said frame and positioned to receive the load from the said conveyer element and to be thereby moved against the tension of its spring support means, a spring support for said receiving element and a connecting medium between said last named load receiving element and said endless conveyer element whereby the conveyer element is moved by the swinging of the said load receiving element.

WALTER W. PABST.